United States Patent [19]

Thompson

[11] 4,185,224
[45] Jan. 22, 1980

[54] ALARM SYSTEM FOR DISPENSING SYSTEMS

[76] Inventor: Stephen L. Thompson, 5525 Altura, Denver, Colo. 80239

[21] Appl. No.: 787,202

[22] Filed: Apr. 13, 1977

[51] Int. Cl.$^2$ ............................................. G08B 21/00
[52] U.S. Cl. ...................................... 340/684; 221/6; 222/39; 340/674
[58] Field of Search .................. 340/267 R, 259, 673, 340/674, 684; 222/23, 39; 221/3, 6, 21; 56/DIG. 15

[56] References Cited

U.S. PATENT DOCUMENTS

| | | | |
|---|---|---|---|
| 2,659,881 | 11/1953 | Bogot et al. | 340/239 |
| 3,527,928 | 9/1970 | Ryder et al. | 235/92 |
| 3,537,091 | 10/1970 | Schenkenberg | 340/684 X |
| 3,723,989 | 3/1973 | Fathauer et al. | 340/259 |
| 3,921,159 | 11/1975 | Steffen | 340/267 R |
| 3,927,400 | 12/1975 | Knepler | 340/267 R |
| 4,004,289 | 1/1977 | Kirk | 340/267 R |
| 4,079,362 | 3/1978 | Grimm et al. | 340/684 |

Primary Examiner—John W. Caldwell, Sr.
Assistant Examiner—Joseph E. Nowicki
Attorney, Agent, or Firm—H. Kenneth Johnston, II

[57] ABSTRACT

Invention herein is an alarm system for product distribution systems. This system is designed to alert the operator of the distribution system in the event there is a blockage in the system or that the system may be empty and further simultaneously indicate at which distribution point the malfunction occurred.

8 Claims, 4 Drawing Figures

ALARM SYSTEM FOR DISPENSING SYSTEMS

BACKGROUND OF THE INVENTION

This invention relates generally to a novel alarm system and more particularly to an alarm system for use in various distribution systems. While certain features of this invention may be adapted for many different uses, the disclosure will be facilitated by directing the invention to the problem of warning the operator of a blockage or lack or product in a distribution system primarily used in the farming industry.

The term distribution system as used shall include liquid and dry fertilizer spreader systems, either ground propelled or distributed by aircraft and planting implements commonly known as drills. All of these systems are related in that they have numerous distribution points for their product. These distribution points have a tendency to become clogged or blocked or to become empty from lack of product. Further, each of these systems have a container for the product sometimes called a hopper.

For ease of describing the within invention and further facilitating the disclosure, the disclosure will be directed to the planting implement commonly known as a drill.

As is well known, a farmer engaged in mechanized planting of various seed utilizes a drill. A "drill" is a form of implement which may have a single hopper or numerous hoppers. The hopper is connected to either a single or plurality of chutes for distribution of the seeds to the ground. It is in the chute that the distribution of seed becomes a critical factor in a farmer's planting. During the operation of planting, a farmer may pull as many as seven or more drills behind the tractor and simultaneous malfunctions may occur on one or more of the drills at the seed chutes. When this happens, the farmer may fail to plant a portion of his field which prohibits the most advantageous crop yield.

There are numerous inventions available for monitoring population including Steffen, U.S. Pat. No. 3,921,159 which are concerned with the seed population in a field. However, such inventions are expensive, bulky and difficult to maintain. The present invention is so simple that a farmer may install this alarm system on any distributing system. A farmer may further, without any electronic knowledge, maintain its operation. Further, the present invention is designed in a manner that a farmer, through this novel alarm system, can observe whether his hired help is properly attending the planting process. With this distribution system, once activation is effected, there is a simultaneous visual and audible alarm. The operator can place the system in the standby mode by actuating the run/inhibit switch which inhibits the audible alarm. However, the visual portion of the alarm remains in effect and the farmer can observe whether or not hired help is running with the system in the inhibit position. The purpose of the run/inhibit switch is to allow the operator to turn the audible portion of the system off while clearing the malfunction and simultaneously prohibit a false malfunction indication by the remaining alarm circuits. Once the malfunction is corrected, the run/inhibit switch is returned to the run position. The verify portion of the alarm system is designed in a manner that once a malfunction has initiated the alarm system, if the malfunction corrects itself within a short time period and the operator returns the switch to the run position, the alarm system resets and the operator can continue planting without having to stop and investigate a false malfunction. An example of such would be where one or more of the chutes would become momentarily clogged and then clear themselves by the foward motion of the drill.

Further, near the top of each drill, there is a visual alarm which is simultaneously initiated with the indicator in the control unit showing which chute has a malfunction. All portions of the alarm system, including indicators, are reset to the standby condition after removal of the malfunction and depressing the reset switch on the control unit. The system is placed back in the run condition after the operator starts the forward motion of the tractor and returns the run-inhibit switch to run.

Further, the present state of the art requires that in the use of monitoring systems presently available, a farmer must dedicate his tractor as well as the specific farm implement. With the exception of a nominal amount of electronics, the present invention is mounted on the drill with a simple electrical disconnect from the tractor, allowing the tractor to be as versatile as the farmer desires.

SUMMARY OF THE INVENTION

Accordingly, it is the object of this invention to provide an alarm system for any distribution system wherein there are a plurality of distribution cites which are not directly observable by the operator of the distribution system.

Another object is to provide an alarm system which does not require the dedication of additional equipment to the distributing system needlessly.

Another object of this invention is to provide an alarm system which simultaneously indicates a malfunction and the cite of such malfunction.

Another object of this invention is to provide an easy maintenance alarm system whereby a non-technically trained party can maintain the system.

DETAILED DESCRIPTION OF THE ILLUSTRATED EMBODIMENTS

Figure 1:
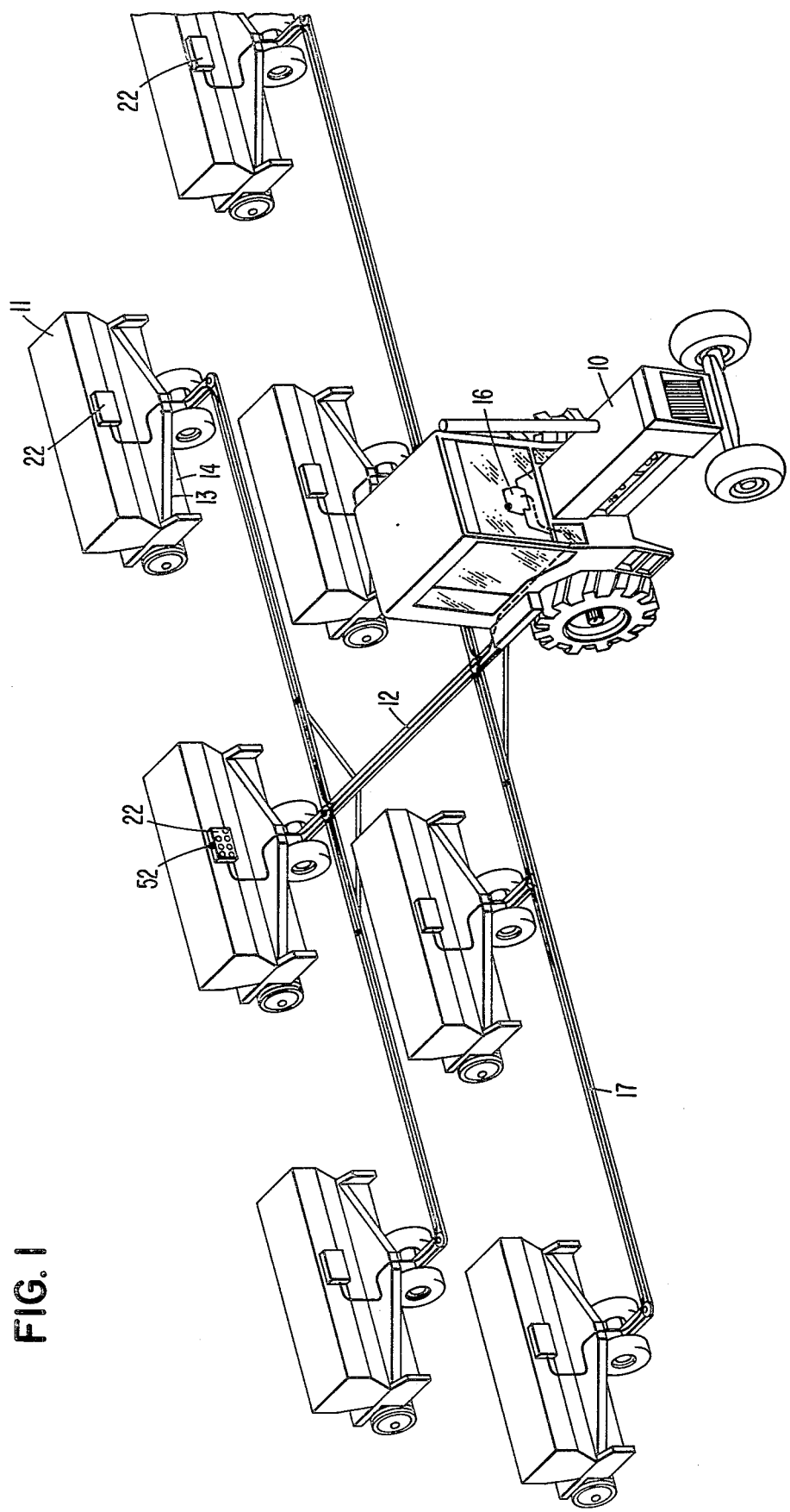
FIG. 1 is an overview of a tractor pulling seven drills embodying an alarm system in accordance with the present invention.

Referring now to FIG. 1, the components of the alarm system of the present invention are illustrated. Here a tractor 10, or any other suitable vehicle, is utilized to transport a hopper 11 or a plurality of hoppers extending traversly of the direction of travel over a distribution area. The connection made between tractor 10 and hopper 11 can be by means of a tow bar 12. Positioned at the lower portion of hopper 11 is a product dispensing mechanism 13 which directs the product to the distribution or planting area. Immediately beneath the product dispensing mechanism 13 is a chute leading to a seed sensor 14 which produces electrical signals. The seed sensor 14 simultaneously produces a signal for both the dispensing of product and when no product is being dispensed. These signals are transmitted to the control unit 22 mounted on the hopper 11. The control unit 22 is connected by cable 17 to the activation unit 16 conveniently located on tractor 10.

Figure 2:
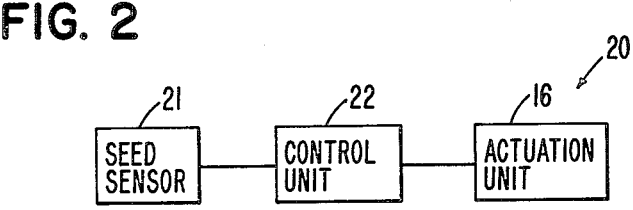
FIG. 2 is an overall simplified block diagram of the alarm system of this invention.

Referring to FIG. 2, there is seen a simplified block diagram of an alarm system constructed in accordance with the principals of this invention and is designed generally by reference numeral 20. The alarm system 20 includes a seed sensor 21 for determining distribution or blockage of seeds and produces signals which are transmitted to control unit 22 which interprets the signals from seed sensor 21 and continually resets its timing means unless a malfunction occurs. Upon a malfunction, control unit 22 initiates a signal to the actuation unit 16 which simultaneously, with control unit 22, produces a visual and audible alarm indicating a malfunction and its location to the operator.

Figure 3:
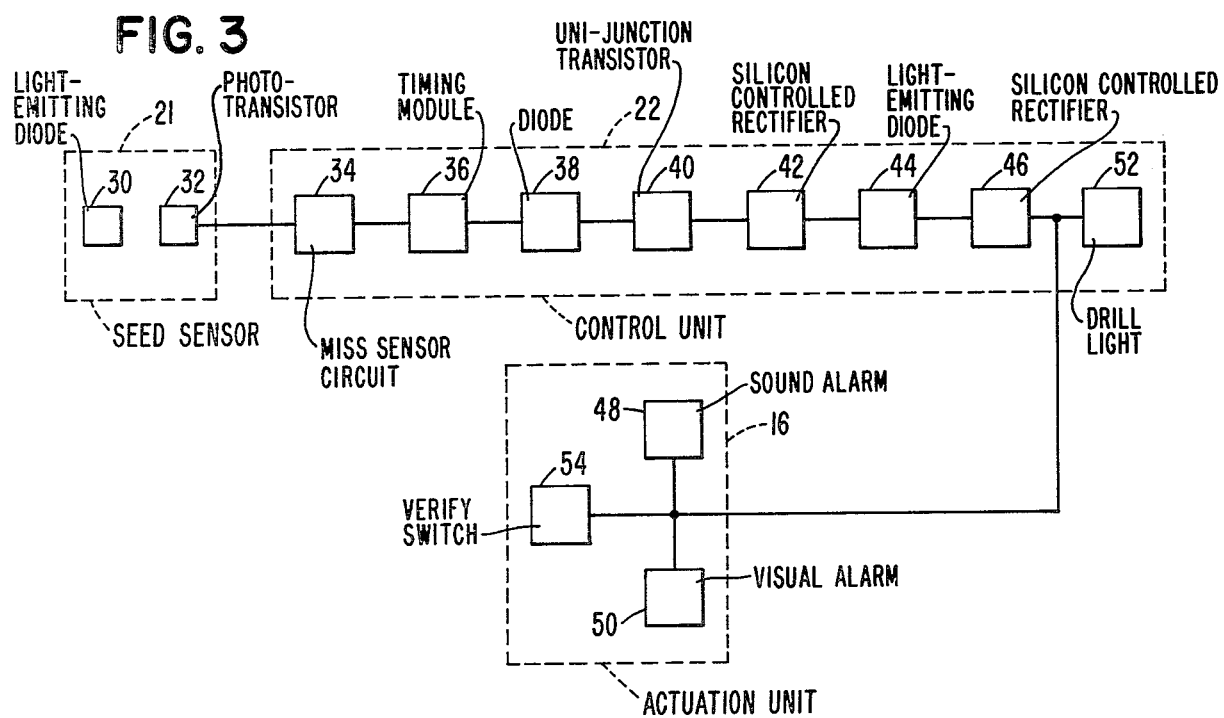
FIG. 3 is a detailed block diagram of a single alarm circuit used within the alarm system.

Referring now to FIG. 3, a single alarm circuit is shown in block diagram. With the system functioning normally, the light from light-emitting diode 30 causes the phototransistor 32 to conduct heavily. This causes the output of the miss sensor circuit 34 to be high. This high output is applied through diode 38 to the timing module 36. This high potential allows the timing module 36 to ramp up, increasing positive voltage. If no product breaks the light source path between light-emitting diode 30 and phototransistor 32, the timing circuit 36 will reach the necessary voltage and uni-junction transistor 40 will activate a silicon controlled rectifier 42 which in turn will light light-emitting diode 44 and simultaneously a silicon controlled rectifier 46 will activate the sound alarm 48, the tractor's visual alarm 50 and the drill light 52. The operator can verify that there is, in fact, a malfunction by depressing the verify switch 54 which resets the circuitry described and if the malfunction continues, the described process will again initiate the alarm. If the malfunction has cleared itself, the circuitry will remain in the normal run state.

Timing module 36 will, in normal operation, continue to reset as long as product continues to break the light path between light-emitting diode 30 and phototransistor 32.

Figure 4:
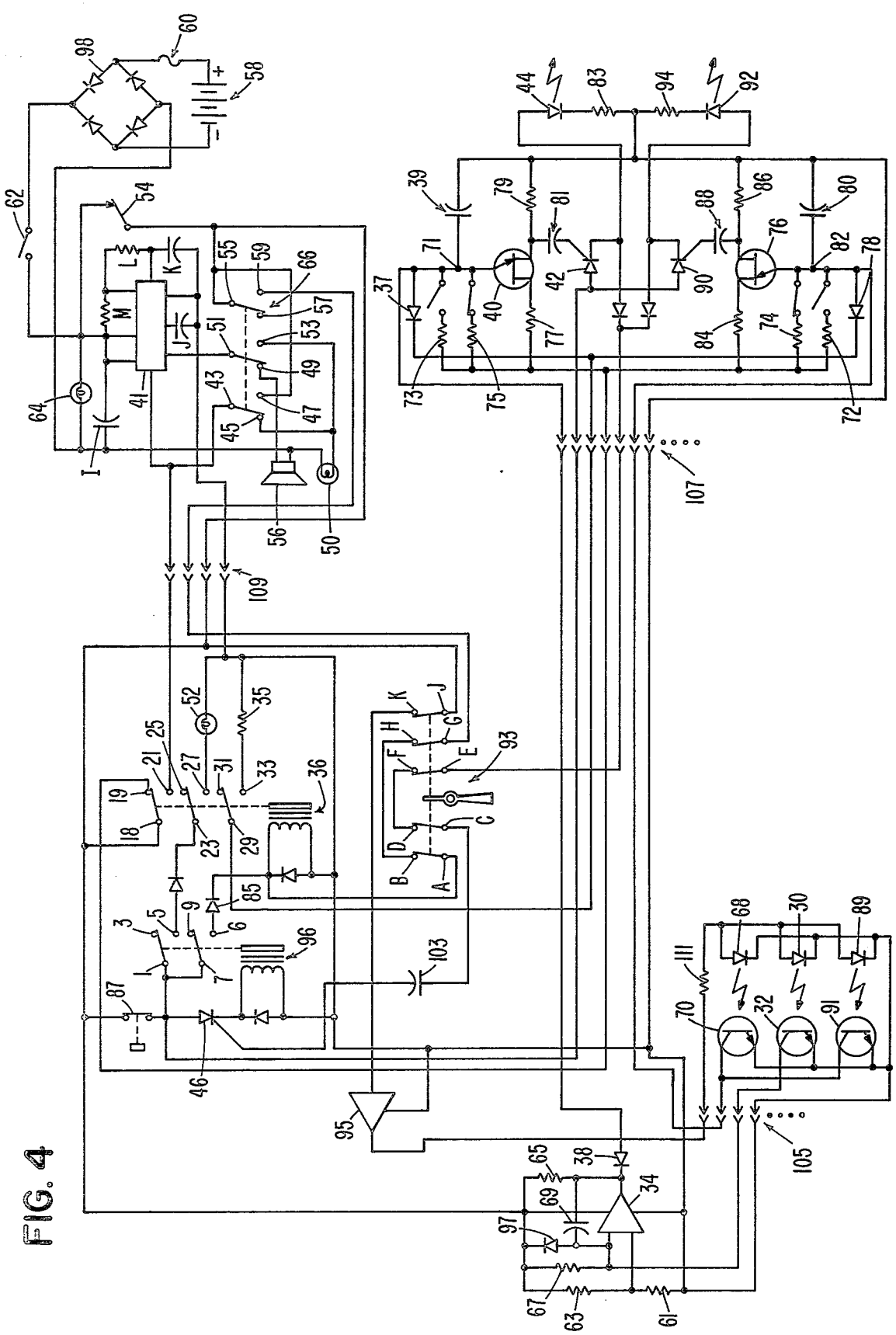
FIG. 4 is a detailed schematic view illustrating an alarm system circuit constructed in accordance with this invention.

Referring now to FIG. 4, the detailed electrical components of the alarm system of the present invention are illustrated. The alarm system has quick disconnect 109 so that tractor 10 is not required to be dedicated to one use. Quick disconnects 105 and 107 provide easy maintenance and repair access. The alarm system is powered by power source 58. Bridge rectifier 98 prevents the inadvertant application of reverse polarity. Fuse 60 is merely an additional protective device from an accidental short or a current overload. Power is applied to the system through switch 62 lighting power lamp 64 thus indicating that there is, in fact, power to the system. When the power is applied, the run/inhibit switch 66 is placed in the standby position so that power is not transferred to control unit 22 shown in FIG. 2. Upon the forward motion of the tractor 10 shown in FIG. 1, the run/inhibit switch 66 is placed in the run position which then activates the rest of the system.

Light from light-emitting diode 68 falls on phototransistor 70 and is maintained in a conductive mode as long as the light path is only momentarily broken. Current is limited by resistor 111 to prevent light-emitting diodes 68, 30 and 89 from burning out. Voltage from 19 is applied through either resistor 72 or resistor 74 or both, depending on the selected timing to phototransistor 70 and uni-junction transistor 76, circuit diode 78 and capacitor 80. In the on condition, phototransistor 70 holds uni-junction transistor 76 in a "low" condition and capacitor 80 does not charge up. When the light path is broken between light-emitting diode 68 and phototransistor 70 by a blockage, the path to ground is extremely restricted and the voltage at junction 82 rises, causing capacitor 80 to start charging in a positive direction. Resistor 84 and resistor 86 set the trigger level of the uni-junction transistor 76. Additionally, resistor 72 and resistor 74 may be selected such that the charging time of capacitor 80 may be adjusted, thus selecting a variable time delay before activation of the alarm. If the blockage should clear itself before capacitor 80 builds to a level of discharge, then the ground from phototransistor 70 will drain the accumulated charge on capacitor 80 and reset to the stable condition.

If the blockage does not clear, the charge on capacitor 80 will reach the required trigger voltage at the emitter of uni-junction transistor 76 and the uni-junction transistor 76 will conduct and produce a sudden positive potential across capacitor 88 as a sharp pulse triggering silicon controlled rectifier 90 which in turn causes the positive voltage to travel through light-emitting diode 92 and resistor 94 to ground, lighting the light-emitting diode 92. When the blockage occurs and the positive voltage is coupled through capacitor 88, silicon controlled rectifier 46 is triggered by the pulse generated through capacitor 103 connecting the positive and negative across coil 96. In energizing coil 96 such energization connects contact 1 to contact 5 disconnecting contact 3 and connects contact 7 to contact 6 disconnecting contact 9 which in turn energizes coil 36. Diode 85 prevents an inhibit positive potential from holding up coil 96. Upon energization of coil 36, such energization connects contact 18 to contact 21 disconnecting contact 19 and connects contact 23 to contact 27 disconnecting 25 and connects contact 29 to contact 33 disconnecting contact 31 simultaneously. Contact 23 with contact 27 lights drill lamp 52. Contacts 29 and 31 couple ground through resistor 35 and circuit diodes 37 and 78 to capacitor 39 and capacitor 80 draining any accumulated charge and preventing a false malfunction indication. Contacts 18 and 21 provide current to timer 41 having capacitors I, J and K and resistors L and M and through switches 43 and 45 to the alarm lamp 50. The output pulses of the timer 41 activate the sound alarm 56 through switches 51 and 49.

Power to light-emitting diode 30 is provided in the manner discribed previously for operation of the light-emitting diode 68.

Light from light-emitting diode 30 provides the light source for phototransistor 32. The output from phototransistor 32 is transmitted to quad comparator 34. The positive input of the comparator 34 is biased to a value slightly higher than the normal output from phototransistor 32 by the voltage dividing resistors 63 and 61. When the positive input is higher than the negative input, quad comparator 34 is held high by the pull-up resistor 65. Circuit diode 38 prevents the positive potential of pull-up resistor 65 from affecting the timing of the circuitry. Resistor 67 is the positive portion of the voltage divider formed with phototransistor 32. When the light path to phototransistor 32 is blocked, the positive potential of the negative input of the quad comparator 34 rises above the fixed value on positive input. This causes quad comparator 34 to drop to a "low" output.

Capacitor 69 maintains the quad comparator 34 in this "low" output state by providing a positive feedback to the positive portion of the quad comparator 34 and curcuit diode 97 prevents capacitive-generated voltage spikes from damaging the negative output. The output of the quad comparator 34 is coupled to the junction 71 of circuit diode 37, uni-junction transistor 40, capacitor 39 and resistors 73 and 75. When dispersed, product breaks the light path to phototransistor 32, the quad comparator 34 goes low and the junction is drained through circuit diode 38. When the light path between light-emitting diode 30 and phototransistor 32 is continuous, that is no product is breaking the light path, quad comparator 34 has a high output and capacitor 39 begins charging. If the light path is broken before capacitor 39 builds to a level of discharge, then the ground from phototransistor 32 causes the comparator 34 to drain the accumulated charge on capacitor 39 and reset the circuit to the stable condition. If the light source is not broken, the voltage at junction 71 rises causing capacitor 39 to start charging in a positive direction. Resistor 77 and resistor 79 set the trigger level of the uni-junction transistor 40. Additionally, resistor 73 and resistor 75 may be selected such that the charging time to capacitor 39 may be adjusted, thus making a variable time delay before activation of the alarm. Once capacitor 39 has reached the trigger voltage at the emitter of uni-junction transistor 40, uni-junction transistor 40 will conduct and produce a sudden positive potential across capacitor 81 as a sharp pulse triggering silicon controlled rectifier 42 which in turn causes the positive voltage to travel through light-emitting diode 44 and resistor 83 lighting the light-emitting diode 44. When the light path between light-emitting diode 30 and phototransistor 32 is not broken and the positive voltage is coupled through diode 81, silicon controlled rectifier 46 triggers connecting the positive and negative across coil 96. Once coil 96 is energized, the same sequencing will occur as earlier described upon the energizing of coil 96.

Once the alarm has initiated, the operator may actuate the verify switch 54 which resets all the circuits described and in the event the malfunction has rectified itself, the system returns to normal. If the malfunction continues to exist, the process described will re-initiate the alarms.

Once the operator has verified that there is, in fact, a malfunction, he stops tractor 10 as shown in FIG. 1 and places the run/inhibit switch 66 in the standby position which prevents a false malfunction on other sensing units which would activate if no product were being dispensed. When in the standby mode, contacts 51 and 49 are disconnected, turning the audible alarm 56 off and contacts 51 and 53 are connected keeping the visual alarm 50 on. The operator may then walk back to the dispensing system which has the drill lamp 52 lit and observe the control unit 22 as shown in FIG. 2 and determine which dispensing mechanism 13 as shown in FIG. 1 has malfunctioned. In the circuitry described in FIG. 4, if a blockage occurs, light-emitting diode 92 will light and if no product is dispensed, light-emitting diode 44 will light and the operator can make the appropriate correction.

Once the operator has corrected the malfunction, the system must be reset by actuating the reset switch 87 which breaks the circuit to coil 96. Thus contacts 1 and 5 disconnect and contacts 1 and 3 reconnect which removes the power to the drill lamp 52. Contacts 7 and 6 similarly disconnect and contacts 7 and 9 reconnect which removes the voltage previously applied to coil 36. However, coil 36 does not de-energize until the run/inhibit switch 66 is returned to the run position wherein contacts 18 and 21 disconnect and contacts 18 and 19 reconnect. Contacts 23 and 27 disconnect and contacts 29 and 31 disconnect completing the resetting of the alarm system.

As further shown in FIG. 4, light-emitting diode 89 and phototransistor 91 are merely a backup signal source as the major malfunctions that occur are blockages. This backup system is not required but adds to the reliability of the system. FIG. 4 further shows a test switch 93 which allows the operator to test the circuitry and verify that all of the circuitry is functioning properly.

In use, the operator applies power to the system through power switch 62 and places the run/inhibit switch 66 in the standby mode. The operator then places the test switch 93 in position such that contacts A and B disconnect applying power to all circuits. If the circuits are working properly, they will timeout and light-emitting diode 44 will light indicating that the path between the light-emitting diode 30 and phototransistor 32 is not being blocked. Simultaneously, when contacts A and B disconnect, contacts C and D disconnect so that the silicon controlled rectifier 46 is not activated and no alarm results. In checking the block portion of the system, test switch 93 is placed in position such that contacts J and K disconnect breaking the power to the light-emitting diodes 68 and 89. This causes phototransistors 70 and 91 to react as if there was a blockage of the light source and the light-emitting diode 92 will light indicating the circuitry is functioning properly. Contacts G and H disconnect applying power to all circuits and contacts E and F disconnect so that the alarm will not activate. Voltage regulator 95 regulates the voltage to the light emitting diodes so they are provided with the proper voltage.

It is understood that while the within invention describes various components such as transistors, diodes and light-emitting diodes, this invention may be practiced utilizing other electrical devices such as, but not limited to, tubes and sensing devices without parting from the spirit and scope of the novel concepts disclosed and claimed herein.

What is claimed is:

1. An alarm system for determining blockages or lack of product in a dispensing system comprising: a frame;
said frame having a control means which can simultaneously monitor and transmit signals affixed to said frame;
a sensor means connected to said control means wherein said sensor means simultaneously determines the distribution or non-distribution of product to a specific area and said sensor means simultaneously and continuously send electrical signals to said control means wherein said control means continuously interprets said electrical signals from said sensor means;
an actuation means connected to said control means wherein said control means upon interpreting a malfunction signal indicating that said dispensing system is blocked so that no product may be dispensed or that said dispensing system lacks the product to dispense from said sensor means initiates a signal to said actuation means which signal simultaneously activates an alarm means of said malfunction in said dispensing system; a verify means to reset said control means and alarm means wherein if said malfunction continues said alarm means will be re-activated by said simultaneous signals from said control means and said actuation means.

2. A sensor means as described in claim 1 wherein said sensor means is a plurality of sensor units.

3. A control means as described in claim 1 wherein said control means is a plurality of control units.

4. A control means as described in claim 3 wherein a plurality of sensor units are attached to said plurality of control units.

5. An alarm means as described in claim 1 wherein said alarm means is a visual alarm.

6. An alarm means as described in claim 1 wherein said alarm means is an audible means.

7. An alarm means described in claim 1 wherein said alarm means is both a visual and audible alarm.

8. An alarm means as described in claim 1 wherein said alarm means comprises a visual indicator mounted externally of a cab of a tractor, a visual indicator mounted internally of said cab of said tractor and an audible alarm; said tractor connected to said frame for providing a means of propulsion for said frame.

* * * * *